(12) United States Patent
Howson

(10) Patent No.: US 11,676,339 B2
(45) Date of Patent: Jun. 13, 2023

(54) SCALABLE PARALLEL TESSELLATION

(71) Applicant: Imagination Technologies Limited, Kings Langley (GB)

(72) Inventor: John W. Howson, St. Albans (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 17/748,982

(22) Filed: May 19, 2022

(65) Prior Publication Data

US 2022/0277521 A1 Sep. 1, 2022

Related U.S. Application Data

(63) Continuation of application No. 17/356,187, filed on Jun. 23, 2021, now Pat. No. 11,373,371, which is a continuation of application No. 16/511,165, filed on Jul. 15, 2019, now Pat. No. 11,074,750.

(30) Foreign Application Priority Data

Jul. 13, 2018 (GB) ..................................... 1811508

(51) Int. Cl.
| | | |
|---|---|---|
| G06T 17/20 | (2006.01) | |
| G06F 9/38 | (2018.01) | |
| G06T 1/20 | (2006.01) | |
| G06T 15/10 | (2011.01) | |

(52) U.S. Cl.
CPC ............ *G06T 17/20* (2013.01); *G06F 9/3885* (2013.01); *G06T 1/20* (2013.01); *G06T 15/10* (2013.01)

(58) Field of Classification Search
CPC ...................................................... G06T 17/20
See application file for complete search history.

(56) References Cited

U.S. PATENT DOCUMENTS

| | | | |
|---|---|---|---|
| 9,105,125 | B2 | 8/2015 | Martin et al. |
| 9,953,395 | B2 | 4/2018 | Doyle |
| 2010/0164954 | A1 | 7/2010 | Sathe et al. |
| 2011/0128285 | A1 | 6/2011 | Gong |
| 2013/0169636 | A1 | 7/2013 | Yang et al. |
| 2014/0152675 | A1 | 6/2014 | Martin et al. |
| 2017/0193697 | A1* | 7/2017 | Paltashev .................. G06T 1/20 |
| 2018/0060995 | A1 | 3/2018 | Doyle |
| 2018/0061124 | A1 | 3/2018 | Prokopenko et al. |
| 2018/0075650 | A1* | 3/2018 | Akenine-Moller ....... G06T 1/20 |

* cited by examiner

*Primary Examiner* — Shivang I Patel
(74) *Attorney, Agent, or Firm* — Potomac Law Group, PLLC; Vincent M DeLuca

(57) ABSTRACT

Methods and tessellation modules for tessellating a patch to generate tessellated geometry data representing the tessellated patch. Received geometry data representing a patch is processed to identify tessellation factors of the patch. Based on the identified tessellation factors of the patch, tessellation instances to be used in tessellating the patch are determined. The tessellation instances are allocated amongst a plurality of tessellation pipelines that operate in parallel, wherein a respective set of one or more of the tessellation instances is allocated to each of the tessellation pipelines, and wherein each of the tessellation pipelines generates tessellated geometry data associated with the respective allocated set of one or more of the tessellation instances.

20 Claims, 8 Drawing Sheets

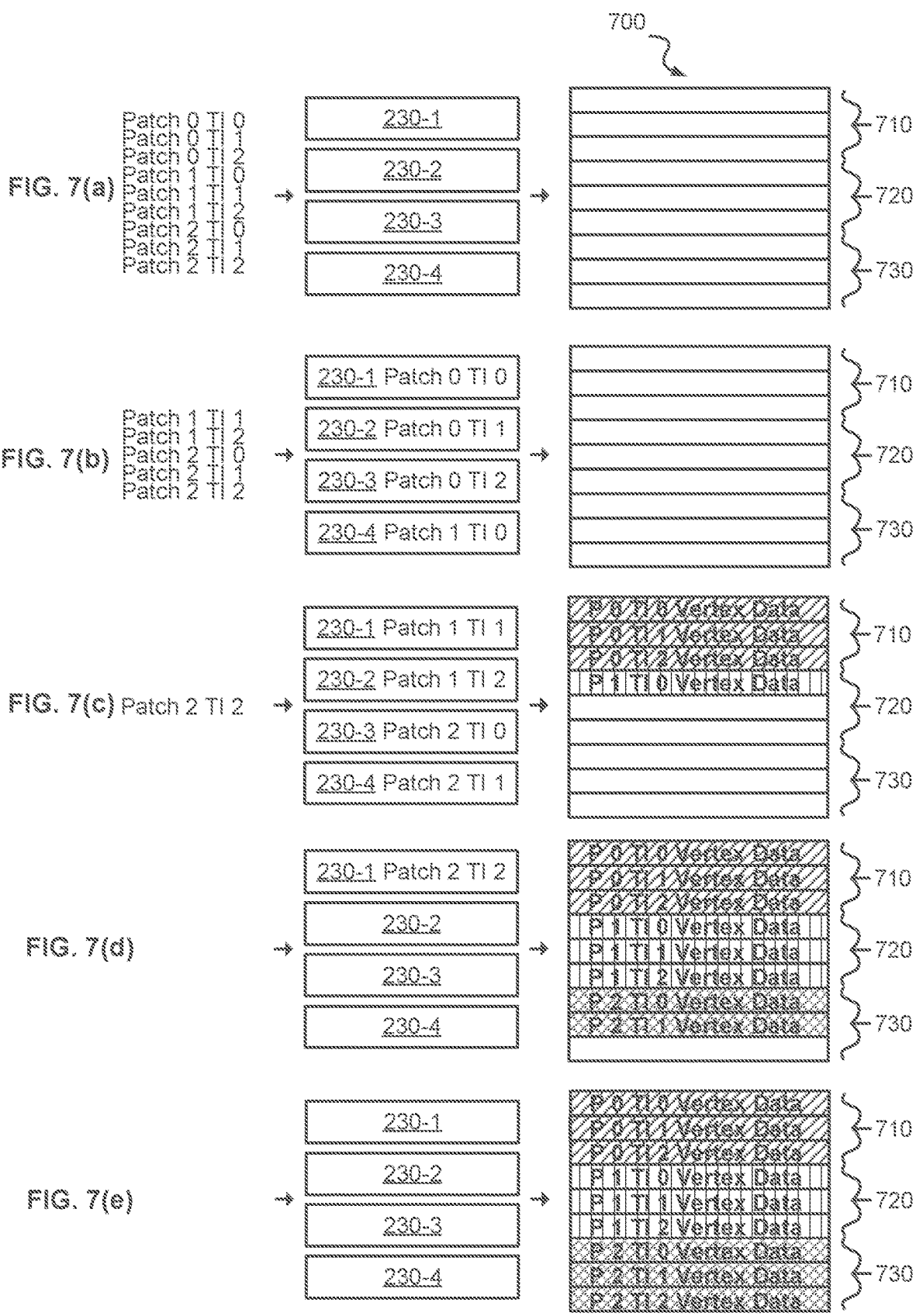

SCALABLE PARALLEL TESSELLATION

CROSS REFERENCE TO RELATED APPLICATIONS AND CLAIM OF PRIORITY

This application is a continuation under 35 U.S.C. 120 of copending application Ser. No. 17/356,167 filed Jun. 23, 2021, which is a continuation of prior application Ser. No. 16/511,165 filed Jul. 15, 2019, now U.S. Pat. No. 11,074,750, which claims foreign priority under 35 U.S.C. 119 from United Kingdom Application No. 1811508.9 filed Jul. 13, 2018.

BACKGROUND

In graphics processing systems, complex geometric surfaces can be represented by patches using geometry data. The geometry data may be in the form of control points that define the surface as a curve, such as a Bezier curve. Typically, such surfaces are processed in a graphics processing system by performing tessellation of the surface to split the surface into a mesh of primitives, typically in the form of triangles, as defined according to graphics processing APIs for rendering graphics, such as OpenGL and Direct3D.

Graphics processing systems are generally efficient due to their capability to perform parallel processing, where a large amount of data is processed in parallel to reduce latency. However, one of the requirements of the tessellation process defined by a number of APIs is that the order in which patches are submitted to a tessellator is maintained in the order by which primitives are emitted by the tessellator. Put another way, the primitives for a first-received patch must be emitted before the primitives of a second-received patch. This ordering requirement can be problematic for graphics processing systems since the relative size of patches can vary greatly.

FIG. 1 illustrates an example tessellation system 100 comprising a number of parallel tessellation units 110, 120, 130 each configured to tessellate a patch. In this example, three patches 101-103 are received in order and are distributed for processing in parallel. In the example of FIG. 1, a first-received patch 101 is sent to tessellation unit 110, a second-received patch 102 is sent to tessellation unit 120, and a third-received patch 103 is sent to tessellation unit 130. In this example, the first-received patch 110 is to be tessellated into many more primitives 111 than the number of primitives 112, 113 to be respectively tessellated for patches 102, 103 (for example because the subsequently-received patches require a lower level-of-detail or are simpler or smaller patches).

Processing the patches in parallel in many cases provides increased throughput. However, since the order of the received patches must be maintained in the order of the emitted primitives, increased latency can occur where the relative amount of processing required for each patch significantly differs. In the example of FIG. 1, the amount of processing required to process patch 101 to generate primitives 111 is much greater than the amount of processing required to process patches 102 and 103 and thus the amount of time required to process patch 102 may be less than to process patch 101. Primitives 112 and 113 may therefore be generated before primitives 111, contrary to the requirements of many APIs. The in-order requirement forces each parallel tessellation unit to be effectively serialised with surrounding units and, to alleviate such serialisation, a large memory may be placed on the outputs to the tessellation units allowing for buffering of the outputs. The memory 140 may be written to in an arbitrary order as each tessellation unit outputs primitives, and may then be read from in such an order as to maintain the correct order of primitives required by the API.

However, the required size of memory 140 can be significant and may scale with the number of parallel processors in operation. The maximum number of vertices generated from tessellation of a single patch may be dictated by the API, and may, for example, be of the order of 4096 vertices, with a typical vertex being 64 to 96 bytes in size. In a system with multiple tessellation units, the memory 140 may need to be sized such that it can at least store the worst case output (e.g. 4096 vertices) vertices from each of the tessellation units. It can be seen that, with these example values, and a relatively small number of tessellation units, e.g. four tessellation units, the size of memory 140 may be of the order of 1 MB.

Memory 140 may be made larger, for example if additional buffering is required, or smaller, for example to target a typical expected number of vertices per patch rather than a worst case number. However, if memory 140 is not sufficiently large to contain the output from patches being processed in parallel at any particular time the tessellation units may need to be halted (i.e. stalled) to ensure the correct ordering of primitives. This may reduce throughput and/or increase latency.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of tessellating a patch to generate tessellated geometry data representing the tessellated patch, the method comprising: processing received geometry data representing a patch to identify tessellation factors of the patch; determining, based on the identified tessellation factors of the patch, tessellation instances to be used in tessellating the patch; and allocating the tessellation instances amongst a plurality of tessellation pipelines that operate in parallel, wherein a respective set of one or more of the tessellation instances is allocated to each of the tessellation pipelines, and wherein each of the tessellation pipelines generates tessellated geometry data associated with the respective allocated set of one or more of the tessellation instances.

There is provided a tessellation module configured to tessellate a patch to generate tessellated geometry data representing the tessellated patch, the tessellation module comprising: tessellation factor logic configured to process received geometry data representing a patch to identify tessellation factors of the patch; a plurality of tessellation pipelines arranged to operate in parallel; and a controller configured to: determine, based on the identified tessellation factors of the patch, tessellation instances to be used in tessellating the patch; and allocate the tessellation instances amongst the plurality of tessellation pipelines to thereby allocate a respective set of one or more of the tessellation instances to each of the tessellation pipelines, wherein each of the tessellation pipelines is configured to generate tessellated geometry data associated with an allocated set of one or more of the tessellation instances.

There is provided a tessellation module configured to tessellate a patch to generate tessellated geometry data representing the tessellated patch, the tessellation module comprising: a plurality of cores, each core comprising a plurality of tessellation pipelines and a controller; and a patch distributor configured to replicate a set of patches and pass the set of patches to each of the plurality of cores; wherein each of the cores is configured to: process a respective patch of the set at a respective tessellation pipeline to identify tessellation factors for the patches of the set; determine, at the controller of the core, based on the identified tessellation factors for the patches of the set, tessellation instances to be used in tessellating the patches of the set; determine, at the controller of the core, an allocation of the tessellation instances amongst the tessellation pipelines of the core; and process the tessellation instances at the allocated tessellation pipelines to generate tessellated geometry data associated with the respective allocated tessellation instances, wherein the controllers of the plurality of cores are configured such that a subset of the tessellation instances for a patch are allocated to the tessellation pipelines of a core, and such that collectively, over all of the cores, all of the tessellation instances for the patch are processed.

The tessellation module may be embodied in hardware on an integrated circuit. There may be provided a method of manufacturing, at an integrated circuit manufacturing system, a tessellation module. There may be provided an integrated circuit definition dataset that, when processed in an integrated circuit manufacturing system, configures the system to manufacture a tessellation module. There may be provided a non-transitory computer readable storage medium having stored thereon a computer readable description of an integrated circuit that, when processed, causes a layout processing system to generate a circuit layout description used in an integrated circuit manufacturing system to manufacture a tessellation module.

There may be provided an integrated circuit manufacturing system comprising: a non-transitory computer readable storage medium having stored thereon a computer readable integrated circuit description that describes the tessellation module; a layout processing system configured to process the integrated circuit description so as to generate a circuit layout description of an integrated circuit embodying the tessellation module; and an integrated circuit generation system configured to manufacture the tessellation module according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 2(*b*) is a flow chart illustrating an example method of allocating tessellation instances amongst tessellation pipelines according to the present disclosure;

FIGS. 7(*a*) to 7(*e*) show an example sequence of steps taken to process a plurality of tessellation instances;

Figure 1:
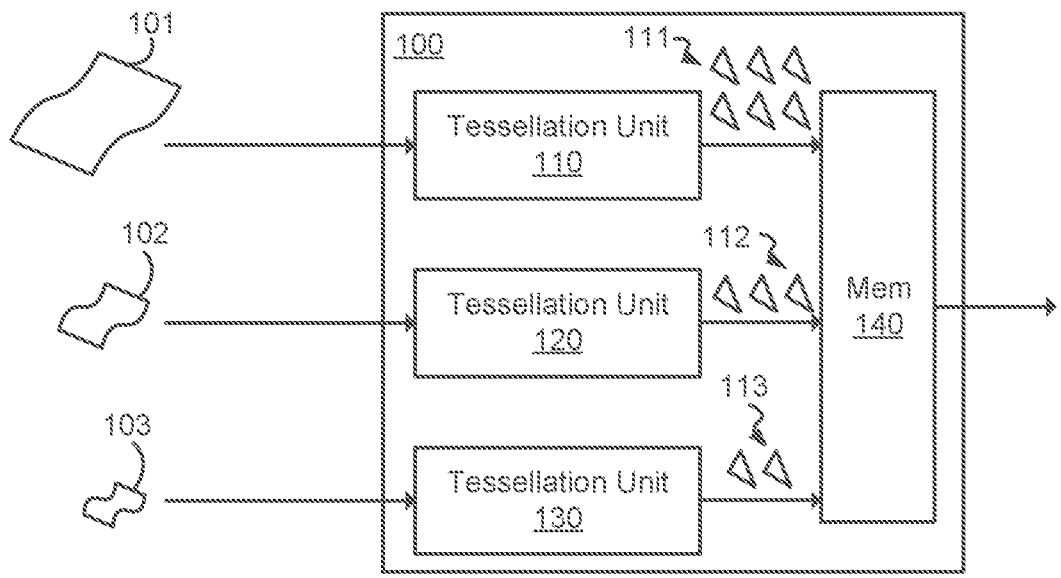
FIG. 1 shows a block diagram of a tessellation system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

The arrangements described herein provide improved tessellation approaches in which the operations required to tessellate a patch can be separated into smaller amounts of work that can be allocated (or distributed) amongst a plurality of a tessellation pipelines for operation in parallel. By providing the arrangements described herein, parallel tessellation of patches having significantly different sizes can be performed by multiple tessellation pipelines, on one or more processing cores, without the reduction in throughput which occurs in the prior art systems described above as a result of the serialisation of the processing of the patches. In particular, tessellation work can be broken into distinct portions (or "tessellation instances") and distributed over multiple tessellation pipelines. This reduces the amount of time that tessellation pipelines are idle, waiting for other tessellation pipelines to complete their work, whilst maintaining the order in which tessellated primitives are output. The term "tessellation pipeline" is used herein to refer to hardware for performing a sequence of processing stages where the output of one processing stage provides the input for a subsequent processing stage. The "tessellation pipelines" may, or may not, be dedicated solely for performing tessellation tasks. For example, the "tessellation pipelines" described herein could be general processing pipelines which can perform a number of different types of processing tasks, such as executing programmable shaders for tessellation stages, as well as performing other processing tasks, such as vertex processing tasks and pixel processing tasks (e.g. texturing and shading) to give just some examples.

Embodiments will now be described by way of example only.

Figure 2A:
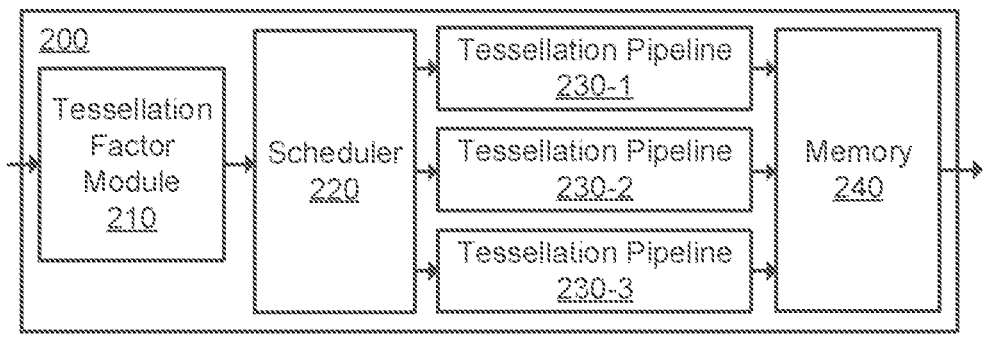
FIG. 2(*a*) shows an example tessellation module according to the present disclosure.

FIG. 2(a) illustrates a tessellation module 200 according to an example of the present disclosure. The tessellation module 200 comprises a tessellation factor module 210, a scheduler 220, a plurality of tessellation pipelines 230-1, 230-2, 230-3, and optionally a memory 240.

The tessellation factor module 210 is configured to receive geometry data for a patch and to process the geometry data for the patch to determine the tessellation factors that are to be used to tessellate the patch. Tessellation factors are values (typically defined per edge or per vertex) that define the level of granularity to which the patch is to be tessellated. The tessellation factors therefore define the amount of tessellation that is to be performed on the patch and therefore the number of primitives that will be generated during tessellation. From the tessellation factors it is therefore possible to determine the amount of geometry data that will be produced during tessellation of the patch. The tessellation factor module 210 may be referred to herein as "tessellation factor logic". In some examples (but not all examples) the tessellation factor logic may share processing resources with the tessellation pipelines 230, e.g. such that the tessellation factor logic and the tessellation pipelines are implemented using the same processing hardware, but they are shown in FIG. 2 as separate components to illustrate the processing flow by which patches are processed in the tessellation module 200.

Scheduler 220 is configured to generate one or more tessellation instances for a given patch based upon the determined tessellation factors for the patch. The scheduler 220 may be referred to herein as a controller. Each tessellation instance has associated therewith at least a portion of the tessellated geometry data of the patch so that the geometry associated with all of the tessellation instances for a patch collectively define the tessellated geometry data for the patch. A tessellation instance can therefore be considered to identify an amount of geometry work that is to be performed to tessellate the whole of or a portion of the patch.

By generating tessellation instances, the total amount of work required to tessellate a patch is split into one or more batches of work that can be performed independently of one another. Tessellation instances therefore represent at least a portion of the data that is to be tessellated. The scheduler is configured to distribute the tessellation instances for processing by tessellation pipelines 230-1 to 230-3. The tessellation instances may be defined to be of the same size, as will be explained in more detail later. The scheduler 220 may be configured to queue the tessellation instances and distribute tessellation instances to tessellation pipelines in a first-in first-out order. In a simple example, a next tessellation instance which has not yet been processed by a tessellation pipeline is passed for processing. This tessellation instance is passed for processing to the next tessellation pipeline that becomes available or idle, which occurs when the tessellation pipeline has finished processing the previously received tessellation instance. However, in other examples, multiple tessellation instances may be submitted at the same time for processing by a tessellation pipeline. A tessellation pipeline runs tasks from one or more tessellation instances in any suitable order to process the tessellation instances. By submitting multiple tessellation instances to a pipeline at a given time, if one tessellation instance stalls for some reason, the pipeline can work on another tessellation instance so that the pipeline does not become idle. Furthermore, as mentioned above, the pipeline could process other types of work along with the tasks of the tessellation instances so that the pipeline does not become idle when there is no tessellation work to do.

Each of the tessellation pipelines 230-1 to 230-3 comprises processing elements that are configured to perform at least a portion of a tessellation process. In this way, tessellation takes place in each tessellation pipeline on a subset of the geometry defined by a patch. As will be appreciated, one or more steps of the tessellation process may need to be performed prior to the tessellation instances being scheduled for processing during identification of the tessellation factors. In some arrangements, this work is re-performed in the tessellation pipelines. However, in some other arrangements, this work is not re-performed in the tessellation pipelines. Instead, the scheduler 220 may store any data that is generated as a result of the operations performed by the tessellation factor module 210 in generating the tessellation factors and passed to the tessellation pipelines to avoid re-performing the operations needed to generate this data. Thus the work performed by the tessellation pipeline may be a pared-down version of the work performed in a conventional, single phase, tessellation pipeline. The tessellation pipelines 230-1 to 230-3 tessellate the received geometry data associated with the particular tessellation instance(s) that is(are) allocated to that tessellation pipeline to generate primitive data defining tessellated primitives generated during tessellation. The geometry data is stored in memory 240. Memory 240 is a memory configured to store the primitive data generated by the tessellation pipelines 230-1 to 230-3 and to emit the geometry in the correct order for further processing. The geometry is typically emitted to a subsequent geometry processing pipeline stage after tessellation (e.g. for performing clipping, viewport transformation or projection, etc.), which may be performed by fixed function circuitry in a separate hardware unit or may be performed by executing suitable instructions on a processing unit which may, or may not, be part of the tessellation pipelines 230.

As mentioned earlier, a tessellation pipeline may generate only a subset of the primitive data for a patch. The primitive data stored in memory 240 is stored so that the primitive data can be combined to form the complete set of primitive data for the patch. For example, a patch may be defined by geometry data formed from four separate tessellation instances. The primitive data derived from the four tessellation instances may, for example, be stored in consecutive memory locations in memory 240 so that the regions of memory spanning the primitive data for the four tessellation instances collectively define the primitive data for the patch.

Figure 3:
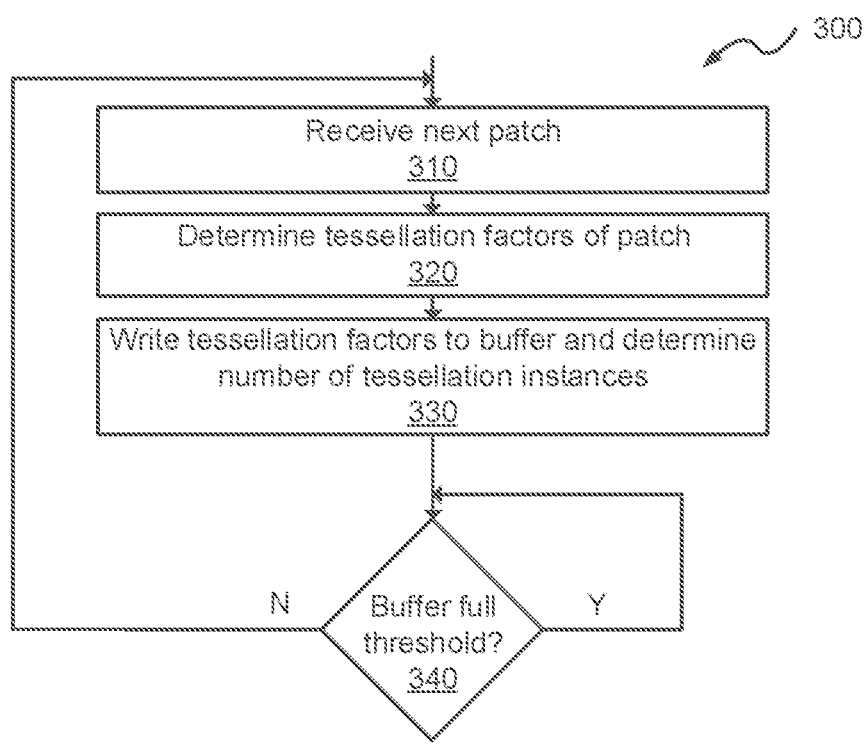
FIG. 3 shows an example process for writing data to a buffer.
Figure 4:
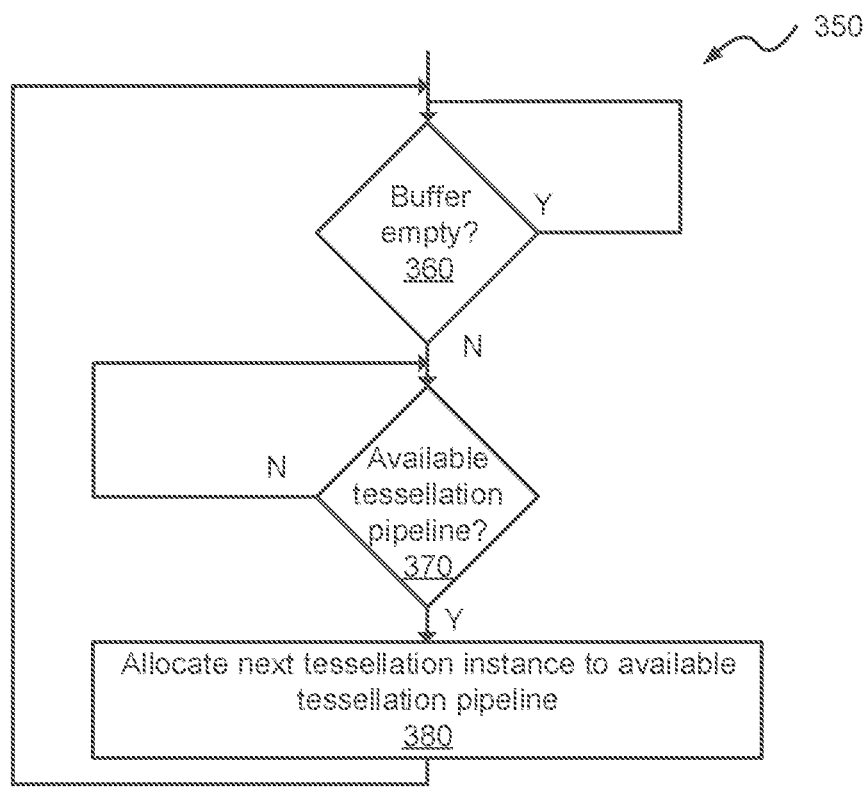
FIG. 4 shows an example process for reading data from a buffer.

An example operation of a tessellation module is illustrated in FIGS. 3 and 4. As set out above, a buffer (which may be implemented in scheduler 220) is configured to hold the geometry data that is to be distributed amongst the tessellation instances. The buffer may be a first-in first-out buffer. In an example implementation there are two separate processes that operate to control the flow of data through the buffer. Specifically, a first process controls the writing of data to the buffer and a second process controls the reading of data from the buffer. In this way, the buffer may be implemented as a circular buffer in which the writing to and reading from the buffer can be handled using pointers.

Figure 2B:
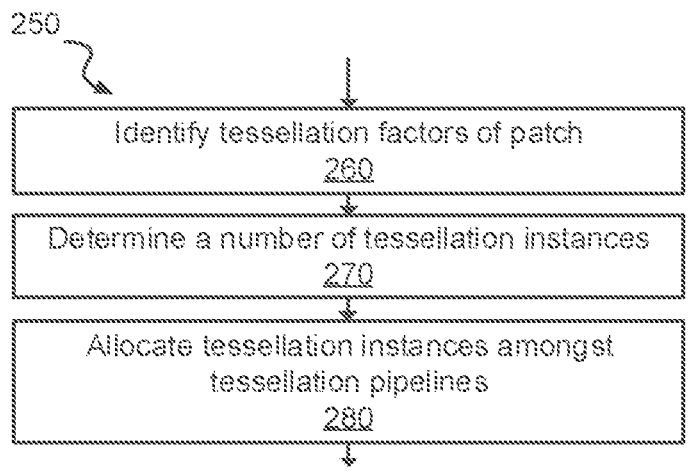

FIG. 2(b) illustrates a method 250 that is performed by the tessellation module 200 to tessellate a patch according to an example. Method 250 begins by identifying the tessellation factors for the patch at step 260. At step 270, the number of tessellation instances to be used to tessellate the patch is determined. For example, the number of tessellation instances to be used will depend on the tessellation factors. In one approach, it is possible to determine the number of primitives that tessellating the patch will result in, based on the tessellation factors. Determining the number of tessellation instances can involve dividing the total number of primitives to be generated to represent the patch into predefined batches of primitives that are to be allocated to different tessellation instances. At step 280, the tessellation instances are allocated amongst the tessellation pipelines to tessellate respective portions of the patch in parallel. In other words, in step 280, an allocation of the tessellation instances amongst the tessellation pipelines is determined.

FIG. 3 illustrates an example method 300 for identifying tessellation factors for tessellating a patch. Specifically, the method 300 of FIG. 3 begins at step 310 at which input geometry data for a next patch to be processed is received in accordance with an application and according to a predetermined order of the API. The input geometry data for a received patch may be defined by a number of control points. At step 320, the received geometry data is processed in order to determine tessellation factors for the patch. The processing of the received patch to determine tessellation factors may include performing vertex shading and hull shading (or at least a portion of these shading processes). Vertex shading is a user-defined shading process that operates on a per-vertex (or per-control point) basis. Hull shading occurs on a plurality of control points together. These processes will be described in more detail below. Having determined the tessellation factors for the patch, at step 330, the number of tessellation instances that are to be used to tessellate the patch is determined and the tessellation factors are written to a buffer. At step 340, if a buffer full threshold is not met, then a subsequent patch is retrieved at step 310. If the buffer full threshold is met, then the method 300 waits until the buffer is sufficiently clear to store tessellation factors for a subsequent patch before the subsequent patch is received.

In an example approach to determining the number of tessellation instances, the number of vertices that will result from tessellating the patch using the determined tessellation factors is determined. The determination of tessellation instances is less costly to perform than a complete tessellation process since it is only necessary to process the input geometry data for the patch (rather than all data generated by the patch), further the shading processes within the hull shading phase that are required to be executed to determine the tessellation factors may only be a subset of the processing required to fully tessellate a patch. In this way, only the data that is required to determine a count of the number of primitives that are generated is determined and recorded.

Set out below is an example equation for determining the number of tessellation instances that are generated from the geometry data (e.g. control points) of a patch.

$$J = \text{Roundup}\left(\frac{N_{verts}}{L}\right)$$

where J is the number of generated tessellation instances for a given patch, $N_{verts}$ is the number of vertices that would be generated by performing tessellation of the patch according to the tessellation factors defined for the patch, and L is the number of vertices that should be processed in a batch at each tessellation pipeline. In an example, $N_{verts}$ can be determined based upon the tessellation factors identified for the patch. L can be determined statically (e.g. pre-determined) based on the amount of memory storage available to store vertex data generated by each tessellation pipeline. In other words, L is the maximum number of vertices that can be assigned to a single pipeline such that processing is not stalled by lack of storage.

For example, if each tessellation pipeline has an allocated memory size L of 1,000 vertices and a patch would generate 5,000 vertices ($N_{verts}$) then J=5 and five different tessellation instances are generated. Each tessellation instance is scheduled for processing amongst the tessellation pipelines.

FIG. 4 illustrates a method 350 for allocating tessellation instances to tessellation pipelines for processing. At step 360, it is determined whether or not a buffer from which data is to be retrieved is empty. If the buffer is empty, there is currently no patch data to be processed and the method waits for data for a patch to be ready. If the buffer is not empty (i.e. there is some data to be processed), at step 370 it is determined whether or not a tessellation pipeline is available to process the data for a patch. A tessellation pipeline is available when at least the first stage of the pipeline is no longer processing a previously received tessellation instance. In some arrangements, since the tessellation pipeline may be configured to implement a pipelined process, processing of a current tessellation instance at a first pipeline stage may begin whilst the pipeline is concurrently processing a previous tessellation instance at a later pipeline stage. In an example, the tessellation pipeline may generate an "available" signal at an appropriate stage in its processing of a tessellation instance to indicate that the tessellation pipeline is available to receive and begin processing a next tessellation instance. At step 380, a next tessellation instance is allocated to an available tessellation pipeline for processing and the method returns to step 360 at which it is determined whether there is further data to be sent to a tessellation pipeline for processing. Allocation of a tessellation instance to a tessellation pipeline may involve transmitting to the tessellation pipeline the input geometry data (e.g. the control points) for the patch and the tessellation factors to be used in tessellating the patch, as well as any side data generated when determining the tessellation factors.

The methods of FIGS. 3 and 4 may run in parallel in a tessellation module so that method 300 operates to fill a buffer with data including the tessellation factors for one or more patches and method 350 operates to read data from the buffer when allocating tessellation instances for processing of one or more patches.

Each pipeline may be configured to process more than one tessellation instance (e.g. from more than one patch) at a time, which may allow the pipelines to avoid becoming idle, or at least reduce the time for which the pipelines are idle.

In an example, the geometry data associated with a tessellation instance is formed by separating the patch into separate batches of output geometry data to be processed that will each produce a maximum number of vertices, which can be determined based on the identified tessellation factors. A next tessellation instance is determined from data generated by processing a current patch. As stipulated by APIs, the geometry data resulting from each patch is to be output from the tessellation system 200 in the order that the patch input data is received. Therefore, control logic coupled to each of the tessellation pipelines may be used to ensure that the order of the primitives/vertices is maintained when the processed primitives/vertices are emitted or read from the tessellation system's memory 240. For example, the tessellation system may communicate with subsequent pipeline stages to indicate the availability of processed primitives/vertices by sending signals, setting flags, or incrementing counters, and a subsequent stage may receive the signal, or test a flag or counter, to determine when processed primitives/vertices associated with a particular tessellation instance may be read from the memory.

A tessellation instance may be associated with a predetermined maximum number of vertices, L. Given a patch to be processed, it can be determined how many tessellation instances will need to be used. For example, based on the tessellation factors identified for the patch, it can be determined how many vertices will be generated during tessellation, given by $N_{verts}$. From a determination of $N_{verts}$, it is possible to calculate the number of tessellation instances that need to be generated—namely $$J = \text{Roundup}\left(\frac{N_{verts}}{L}\right)$$

vertices. In an example patch where $N_{verts}$=4,500 and L=1,000, the first tessellation instance may relate to the generation of the first 1,000 vertices (e.g. with indices 0 to 999), the second tessellation may relate to the generation of the next 1,000 vertices (e.g. with indices 1,000 to 1,999), and so on. The final, fifth tessellation instance may comprise the final 500 vertices (e.g. with indices 4,000 to 4,499). Alternatively, the vertices may be distributed more evenly between the tessellation instances. For example, 4,500 vertices may be distributed to 5 instances by associating 900 vertices with each tessellation instance.

As will be appreciated from the above, a tessellation instance therefore relates to a subset of the tessellation work required to tessellate a patch. The data required for each tessellation instance includes the necessary data to be processed in order to generate the vertices of primitives associated with that tessellation instance. The data includes all of the patch control data and tessellation factors along with data that indicates where in the patch tessellation should begin for a given instance. It should also be appreciated that the data may depend on the position of the vertices associated with the tessellation instance within the tessellated patch. For example, for high index vertices it may be necessary to perform a subset of tessellation operations for lower index vertices in order to allow the formation of complete primitives.

Figure 5:
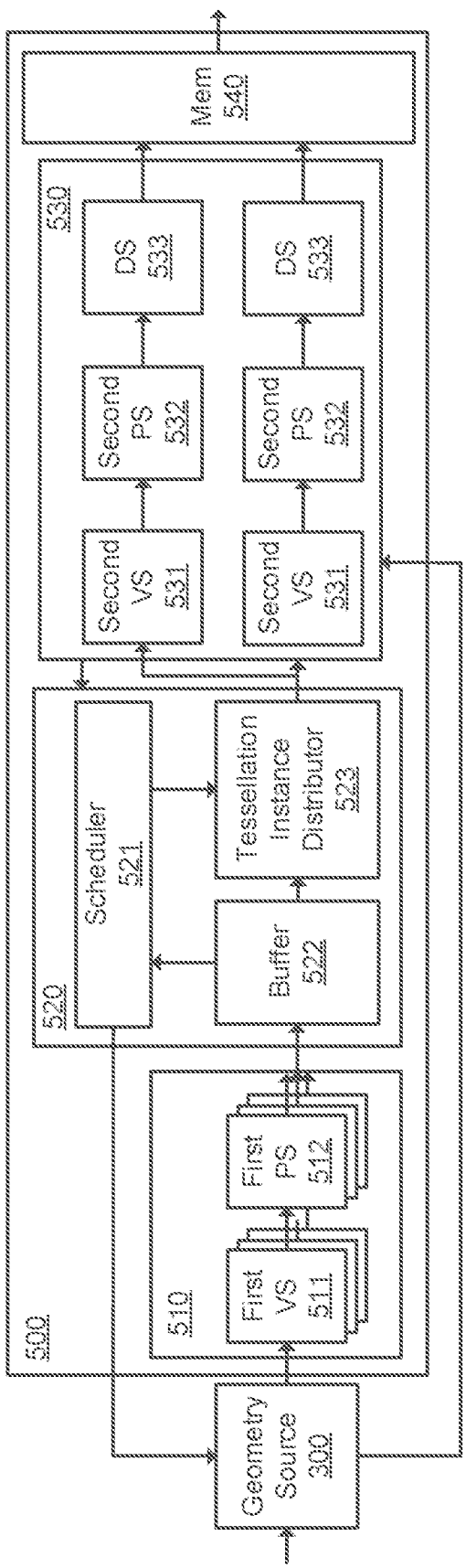
FIG. 5 shows another example tessellation module according to the present disclosure.

FIG. 5 illustrates an example tessellation module 500 according to the present disclosure. The tessellation module 500 comprises a first tessellation stage 510, a controller 520, a second tessellation stage 530, and optionally a memory 540 (though the memory may be external to the tessellation module 500). The tessellation module 500 is similar to the tessellation module 200 described above and shown in FIG. 2. In the tessellation module 500, tessellation factor logic is implemented as the first tessellation stage 510; tessellation pipelines are implemented in the second tessellation stage 530; and the controller 520 includes a scheduler 521 as well as other components as described below. The first and second tessellation stages (510 and 530) may share processing resources, e.g. such that they are implemented using the same processing hardware, but they are shown in FIG. 5 as separate stages to illustrate the functionality of the way in which patches are processed in a pipelined manner.

The tessellation module 500 is provided with geometry data for one or more patches from a geometry source 300 which is configured to provide geometry data for patches in an order defined by an externally operating application. The geometry source 300 receives a control signal from the tessellation module 500 that controls the transmission of geometry data to the tessellation module 500. The geometry data for a particular patch may comprise untransformed vertex inputs in the form of control points that define the surface geometry of the patch. The geometry data for a patch is received at the first tessellation stage 510 from the geometry source 300.

The first tessellation stage 510 is configured to process the input geometry data for a patch to determine the tessellation factors for the patch, so that it can be determined how many tessellation instances are to be instantiated by the controller 520 to tessellate the patch. The amount of processing required by the first tessellation stage in order to determine the tessellation factors may depend upon the application being run. For example, the tessellation factors may be directly provided—i.e. the tessellation factors may be hard-coded. If this is the case, then no processing of the geometry is required by the first tessellation stage. For some applications, the tessellation factors may be determined programmatically—for example based on the distance of the patch from the screen and/or based on the size of the patch. For such applications, it may be necessary to process the untransformed vertex data (e.g. the control points of the patch) to determine the tessellation factors.

In an example, the first tessellation stage may comprise one or more instances of a first vertex shader 511. The one or more first vertex shaders 511 may be configured to perform programmatic per-vertex operations on the received untransformed vertex data. For example, the one or more first vertex shaders may be configured to perform at least a subset of the functions performed by a vertex-shader as defined in the Direct3D or OpenGL standards. Since the tessellation module 500 may comprise one or more first vertex shaders, the per-vertex shading operations could be performed on control points in parallel for a given patch with each first vertex shader performing a subset of the per-vertex operations for the patch.

The processed vertex data output from the one or more first vertex shaders 511 is passed to one or more first patch shaders 512 which are configured to perform operations on a plurality of vertices by receiving one or more processed vertices and to collectively process the received vertices. For example, the one or more patch shaders 512 may be configured to perform at least a subset of the functions performed by a hull-shader as defined in the Direct3D standards or a tessellation control shader as defined in the OpenGL standards. The one or more first patch shaders 512 are configured to perform a minimal amount of processing required to generate the tessellation factors. Accordingly, the vertex shaders and patch shaders may have a reduced size and/or complexity when compared to complete vertex/hull shaders required to fully implement the operations as defined by the application programmer for these stages (as defined by Direct3D and/or OpenGL standards).

The one or more first patch shaders 512 are configured to pass to controller 520 the identified tessellation factors for the patch, and optionally any side data generated as a result of the processing. The side data may, for example, comprise coefficients for the patch. The controller 520 comprises a buffer 522 configured to store data relating to processed patches. The controller 520 further comprises a scheduler 521 and a tessellation instance distributor 523.

Figure 6:
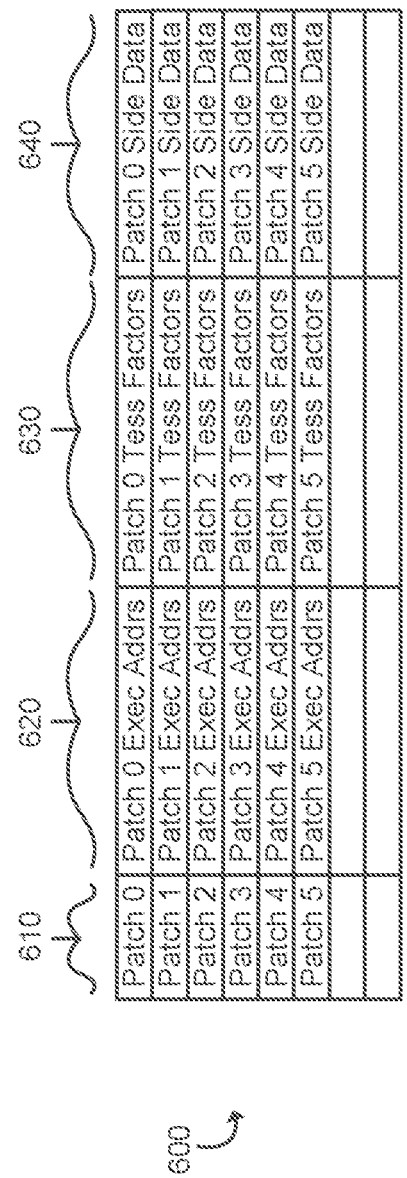
FIG. 6 shows an example of the organisation of data within a buffer.
Figure 8A:
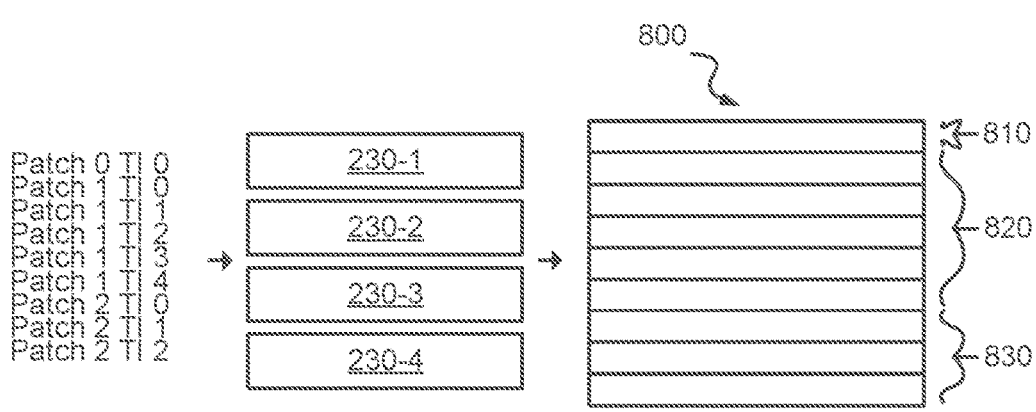
FIGS. 8(*a*) to 8(*e*) show another example sequence of steps taken to process a plurality of tessellation instances.
Figure 8B:
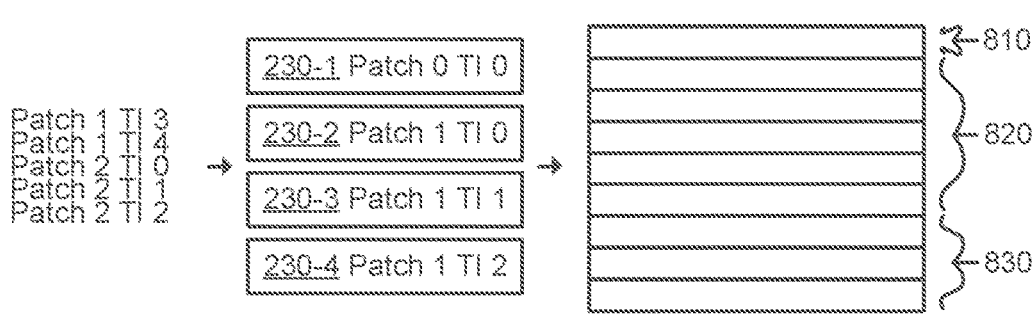
Figure 8C:
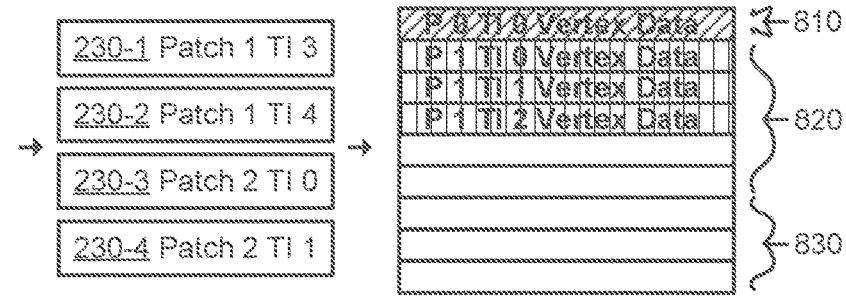
Figure 8D:
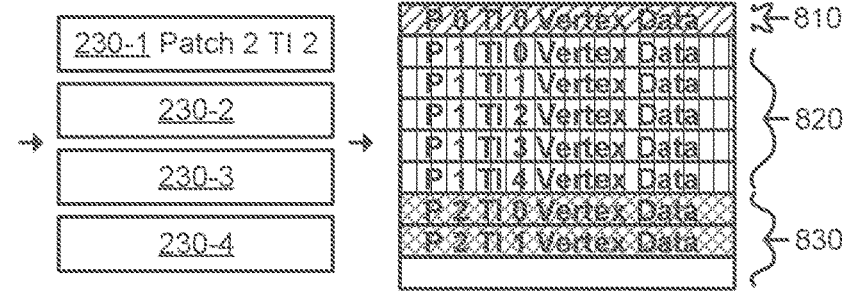
Figure 8E:
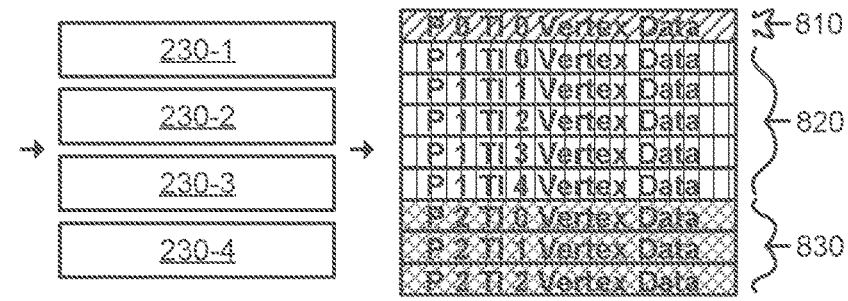

Buffer 522 is configured to store data generated by the first tessellation stage 510 for each of a number of patches. An example of the organisation of data within buffer 522 is illustrated in buffer 600 of FIG. 6. As shown in FIG. 6, data associated with each patch may be stored together. For example, for each patch, the buffer 600 may store a patch identifier 610 that identifies the particular patch to be processed. The buffer 600 may also store, for each patch, execution addresses 620 that identify memory addresses of instructions to be executed during tessellation of the patch by the second tessellation stage 530. For example, this may include vertex shading instructions, hull shading instructions, and/or domain shading instructions. For each patch, buffer 600 may also store the tessellation factors 630 determined in the first tessellation stage 510. The buffer 600 may optionally also store side data for each patch generated as a result of processing data in the first tessellation stage 510. The side data may include some or all data generated as a result of the processing performed during the first tessellation stage and that can be re-used during the second tessellation stage. By storing this data, it is not necessary to re-generate the side data during the second tessellation stage which may reduce the amount of duplicated processing in the second tessellation stage as a result of splitting tessellation into multiple stages.

Buffer 522 stores data including the tessellation factors for each patch to be processed. In FIG. 5, controller 520 is configured to identify from the tessellation factors the number of tessellation instances to be used to process each patch. This number of tessellation instances may, for example, be stored in the tessellation instance distributor 523 or in buffer 522. Tessellation instance distributor 523 is configured to allocate (e.g. distribute) tessellation instances amongst the tessellation pipelines in the second tessellation stage 530. The tessellation instance distributor 523 may, in an example, be configured to implement the method of FIG. 4. In particular, the tessellation instance distributor 523 may be configured to determine whether or not buffer 522 is empty. If the buffer is not empty, then there is at least one tessellation instance of a patch to be processed.

As mentioned above, the tessellation instance distributor 523 may be configured to determine the number of tessellation instances that are to be generated to process a patch based on the tessellation factors for the patch. Then the tessellation instance distributor 523 determines whether or not there is a tessellation pipeline available to process the next tessellation instance to be processed. For example, the tessellation instance distributor 523 may receive a signal from scheduler 521 which indicates the availability status of one or more tessellation pipelines. If a tessellation pipeline is identified as available, the tessellation instance distributor 523 provides the next tessellation instance to the available tessellation pipeline. A tessellation pipeline may be "available" when it is ready to receive a tessellation instance even if the tessellation pipeline is currently not idle. The tessellation instance provided to a tessellation pipeline may be enqueued at the tessellation pipeline for processing (e.g. in a FIFO). The execution addresses, tessellation factors, and optionally the side data for a particular patch are passed to a particular tessellation pipeline for processing. The distributor 523 also provides, to the particular tessellation pipeline, an indication of which portion of the patch the particular tessellation instance relates to. The tessellation instance distributor 523 may keep track of the tessellation instances that are to be distributed for a particular patch. For example, for each patch the distributor 523 may maintain a count of the number of tessellation instances required to process the patch and to maintain an indication as to which of the tessellation instances have been sent for processing. Flags may be used to maintain the processing status of each tessellation instance.

The scheduler 521 is configured to control the reading from and writing to the buffer 522 to ensure that the buffer does not overflow whilst also attempting to minimise the amount of time that the buffer is empty. This allows the tessellation module 500 to maximise the amount of time that the first and second tessellation stages 510 and 530 are operating to optimise throughput. In particular, the scheduler 521 monitors the number of entries currently in the buffer. If the buffer is not full (e.g. a buffer threshold is not met), the scheduler 521 sends a signal to the geometry source 300 to emit another patch of data for processing by the first tessellation stage 510. Moreover, the scheduler 521 is configured to control the tessellation instance distributor 523 by sending a control signal to send data for a tessellation instance to a tessellation pipeline in the second tessellation stage 530. The scheduler 521 controls the tessellation instance distributor 523 based on the availability of tessellation pipelines received as status information from the second tessellation stage 530.

In the example of FIG. 5, second tessellation stage 530 comprises plurality of tessellation pipelines, each comprising a second vertex shader 531, a second patch shader, and a domain shader 533. A tessellation pipeline may also comprise a fixed-function tessellation block (not shown) that performs a tessellation process as defined in more detail below. A tessellation pipeline may also comprise a geometry shader configured to apply geometry shading to the output of the domain shader 533.

The second vertex shaders 531 are each configured to perform tessellation pipeline operations on a per-vertex basis (e.g. on the control points of a patch). In particular, the second vertex shaders 531 may be configured to perform at least a subset of the functions performed by the vertex-shader as defined in the Direct3D or OpenGL standards. Since some of the vertex shading required to tessellate a patch was performed by the one or more first vertex shaders 511 in the first tessellation stage 510, that processing may optionally be skipped in the second tessellation stage 530. For example, where side data 640 relating to the output from the first vertex shaders 511 is stored in the buffer 522, it may be possible to skip that processing during the second tessellation stage. For example, the first and second vertex shaders may collectively define a vertex-shader as defined in the Direct3D or OpenGL standards, with each of the first and second vertex shaders performing respective subsets of the defined functionality. For example, the first vertex shaders 511 may perform the geometry processing necessary to provide the first patch shaders 512 with the required geometry data to identify the tessellation factors whilst the second vertex shaders 531 may perform other types of data processing (for example, the second vertex shaders 531 may change the basis function of a patch (e.g. Bezier to Catmul-Rom)). Alternatively, it may be possible to reduce the storage requirements in the buffer 522 by not storing the outputs of the first vertex shaders between tessellation stages. In this way, the second vertex shaders 531 may be required to duplicate some of the processing already performed by the first vertex shaders 511. As illustrated in FIG. 5, the second vertex shaders may be configured to receive the untransformed geometry data from the geometry source 300. The result of this is that it is not necessary to store the first vertex shader outputs in the buffer 522.

The second patch shaders 532 may be configured to perform at least a subset of the functions performed by the hull-shader as defined in the Direct3D standards or the tessellation control shader as defined in the OpenGL standards. In this example, the second patch shaders 532 are stripped of any processing that involves the generation of tessellation factors and optionally the generation of any side data. This is because this data has been determined during the first tessellation stage and is held in buffer 522 so it is not necessary to regenerate this data. The results generated by the second patch shaders (along with the pre-generated tessellation factors and side data) are passed to a fixed function tessellation module (not shown) which performs the pre-defined process of tessellating the geometry of the tessellation instance in accordance with the tessellation factors and side data to generate output data defining domain indices and coordinates for sub-dividing the patch. For example, the outputs of the second patch shaders 532 and fixed function-tessellators are the tessellated primitives and domain indices and UV coordinates. Alternatively, the domain points may by pre-generated by a fixed function tessellation unit within the tessellation instance distributor and distributed directly along with the patch instances. As with the first and second vertex shaders, the first and second patch shaders may collectively define a hull-shader or tessellation control shader, with each of the first and second patch shaders performing respective subsets of the defined functionality. Alternatively, the second patch shaders may duplicate at least a portion of the processing performed by the first patch shaders in order to reduce the amount of storage required for buffer 522.

The one or more domain shaders 533 may be configured in accordance with the domain shader as defined in the Direct3D standards and the tessellation evaluation shader as defined in the OpenGL standards. Specifically, the domain shaders 533 are configured to consume the output domain coordinates from the fixed function tessellation unit and the output control points from the second patch shader 532 and to generate the position (and other data) of one or more vertices of the tessellated geometry. For a tessellation instance, the vertices of a tessellation instance are generated and passed to memory 540. From memory 540, the vertex data for each patch may be provided for further processing. For example, the tessellated geometry may be further processed using a geometry shader and then passed to a culling module configured to cull vertices that are not visible in the scene (for example, using back-face culling or small-object culling) and then onto clipping, viewport transform and projection modules.

As mentioned earlier, memory 540 may be one or more physical memories configured to store the results of each tessellation pipeline. For example, the one or more physical memories may form a plurality of logical memories, with each logical memory configured to store the combined geometry from each of a plurality of tessellation instances that collectively define the tessellated vertices for a patch. In this way, the tessellated vertex data for a patch may be reconstituted in memory 540. This will be illustrated in more detail in relation to FIG. 7.

FIGS. 7(*a*) to 7(*e*) illustrate a simple example in which a sequence of steps are taken to process a plurality of tessellation instances using four tessellation pipelines, namely pipelines 230-1 to 230-4. FIG. 7(*a*) illustrates a first step in which nine tessellation instances are identified. In this example, there are three patches which are to be separately tessellated which are each separated into three tessellation instances such that each patch contains first (denoted Patch "x" TI 0), second (denoted Patch "x" TI 1) and third (Patch "x" TI 2) tessellation instances. As can be seen from FIG. 7, the resultant vertex data is to be stored in memory 700. In the example of FIG. 7, a single physical memory is used. The single physical memory is separated into three logical blocks, with each logical block configured to store the vertex data generated for a patch. For example, first logical block 710 is configured to store the vertex data for the first patch, second logical block 720 is configured to store the vertex data for the second patch, and third logical block 730 is configured to store the vertex data for the third patch.

In FIG. 7(*b*), it is determined that the four tessellation pipelines 230-1 to 230-4 are all available for processing since in this example, tessellation has just started. Accordingly, the first tessellation instance (Patch 0 TI 0) is passed by a tessellation instance distributor to the first tessellation pipeline 230-1 for processing. Similarly, the next tessellation instance (Patch 0 TI 1) is passed to the next tessellation pipeline 230-2 and so on until the first four identified tessellation instances have been passed to the four tessellation pipelines for processing. As a result, there are five tessellation instances which have yet to be allocated for processing by a tessellation pipeline. No further allocation of tessellation instances to tessellation pipelines can take place at this time because there are no further available tessellation pipelines. In the simplified example shown in FIGS. 7(*a*) to 7(*e*), the pipelines contain a single instance at a time. However, in other examples, the pipelines might not be constrained to contain only a single instance at a time. The vertex shading, patch shading and domain shading stages are programmable in nature so it can be beneficial for the pipelines to process a plurality of instances in parallel, which allows the pipelines to hide (a) internal pipeline latency and (b) any latency associated with external memory fetches. In these examples, the memory 700 has (at least) enough space to consume enough parallel instances to hide at least internal latency.

At FIG. 7(*c*), the tessellation pipelines have each completed the processing of the first batch of received tessellation instances and have provided the resultant vertex data for the first batch of tessellation instances to memory 700. As can be seen from FIG. 7(*c*), the vertex data generated from the tessellation instances for the first patch are stored, in order, in logical memory 710. Similarly, the first tessellation instance for the second patch (P 1 TI 0) is stored in the logical memory configured to store vertex data for the second tessellation pipeline. In other examples the memory 700 may not be divided into separate logical blocks, and the storage for vertex data generated from the tessellation instances may be stored out of order, either in a logical memory, or in single memory 700. Allocation of storage space from a memory may be managed by any memory management technique, such as using pointers, indices, or linked lists, that allows the generated vertex data to be located and read out to the subsequent pipeline stages in order. In the example of FIG. 7(*c*) all of the vertex data generated from the tessellation instances of the first patch is available in the memory. The availability of the data may be indicated to the subsequent pipeline stages and the data may then be read from memory 700. The data may be read from the memory simultaneously with the continuation of the tessellation process illustrated in FIGS. 7(*d*) and 7(*e*), and the memory may then be released for the storage of vertex data generated from the tessellation instances of further patches. In another example, the availability of the data may be indicated to the subsequent pipeline stages for vertex data from each of the tessellation instances individually, rather than waiting until vertex data for the full patch is available. The order in which vertices arrive at subsequent pipeline stages may be maintained by communication between the tessellation system and the subsequent pipeline stages, for example as described above by sending signals, setting flags, or incrementing counters, such that the subsequent pipeline stage reads each item of generated vertex data in order, and not before it becomes available in memory 700.

As described earlier, a tessellation pipeline can identify when it is available to receive a tessellation instance. For example, where the tessellation pipeline is a pipelined process it may be possible to receive the next tessellation instance prior to completion of the previous tessellation instance. Once it has been identified that a tessellation pipeline is available to receive a tessellation instance, the next tessellation instance to be processed is passed to the tessellation pipeline for processing. As can be seen in FIG. 7(*c*), a second batch formed of the next four tessellation instances from the list of tessellation instances to be processed are respectively passed to tessellation pipelines for processing.

In FIG. 7(*d*), vertex data for each tessellation instance of the second batch of tessellation instances is generated and stored in the appropriate portion of memory 700. As can be seen, the vertex data for the second patch has been stored to logical memory location 720. The vertex data for the first and second tessellation instances of the third patch (P2 TI 0 and TI 1) are stored to the logical memory for that patch 730. In FIG. 7(*d*) the remaining third tessellation instance of the third patch (P 2 TI 2) is passed to the first tessellation pipeline and is processed and stored in logical memory 730 as shown in FIG. 7(*e*).

FIG. 8 illustrates a similar arrangement in which three different patches are to be tessellated that generate a different number of vertices. For example, in FIG. 7 each patch when processed in the first tessellation stage generates three tessellation instances. In contrast, in FIG. 8 a first patch (Patch 0) forms a single tessellation instance, a second patch (Patch 1) forms five tessellation instances, and a third patch (Patch 2) forms three tessellation instances. Memory 800 of FIG. 8 is filled at a rate which depends on the number of tessellation pipelines that are present in the tessellation module.

Similar to the example shown in FIG. 7, in the example shown in FIG. 8 the pipelines contain a single instance at a time. However, as described above, in other examples, the pipelines might not be constrained to contain only a single instance at a time, and instead the pipelines may process a plurality of instances in parallel.

FIGS. 7 and 8 show examples of systems in which the memory 700 or 800 is large enough to contain all of the vertex data generated by the tessellation instances. The scheduling of tessellation instances into the tessellation pipelines allows a significant further reduction in the amount of memory required compared to the examples of FIGS. 7 and 8, and particularly over the system of FIG. 1. In the example of FIG. 7, it can be seen that tessellation instances are distributed across the four tessellation pipelines, such that tessellation instances relating to Patch 0 are scheduled before tessellation instances relating to Patch 1, and tessellation instances relating to Patch 1 are scheduled before tessellation instances relating to Patch 2. This in contrast to the example of FIG. 1, where each patch is scheduled to be tessellated entirely on one particular tessellation unit. In FIG. 7(*c*) it can be seen that the first four sets of generated vertex data, written to logical memories 710 and 720, are the first four sets that must be read from the memory 700 when the vertices are read out in the correct order. Similarly, in FIG. 7(*d*), the next four sets of generated vertex data, written to logical memories 720 and 730 are the next four sets that must be read from the memory, in order, after the vertex data from the previous step. In FIG. 7(*e*), the final set of generated vertex data, written to logical memory 730, is the last that must be read from the memory. The requirement for reordering sets of vertex data is therefore limited to the number of sets of vertex data that may be generated by the four pipelines. In theory, a memory large enough to store four sets of generated vertex data (or T sets of generated vertex data, in a system with T tessellation units) is all that is required. The memory requirement may be increased if each tessellation pipeline may contain more than one tessellation instance at a time. For example, a system with four tessellation pipelines, where each pipeline may contain two tessellation instances may generate up to eight sets of vertex data in an arbitrary order. A memory capable of storing eight sets of vertex data may therefore be used to allow reordering. The memory size may also be increased beyond the size calculated in this way, if additional buffering is desired. For example, double buffering may be used, such that the tessellation pipelines can be writing into memory at the same time as subsequent pipeline stages are reading out. Additional buffering may be used, e.g. as a FIFO buffer, to smooth the flow of data where the rate of generation of vertex data by the tessellation units, or the rate of consumption by the subsequent pipeline stages is not uniform. The size of the tessellation instances may be selected in order to target a particular memory size. In the example where a tessellation instance is associated with up to 1000 vertices, it can be seen that the memory is approximately one quarter of the size of the memory required for the system of FIG. 1, in which a patch could generate up to 4096 vertices. The total number of vertices that can be generated from a patch may not be under the control of the tessellation system designer, but the size of a tessellation instance is. The number of vertices associated with a tessellation instance may be made much smaller, e.g. 16 vertices, in which case the amount of memory required is reduced to approximately 6 kilobytes (for the system with four tessellation pipelines).

In the arrangement described above, the tessellation instances are defined based upon a pre-determined number of tessellated vertices (i.e. a vertex count) and relate to the amount of memory that is allocated to each tessellation pipeline. In the arrangements described above, some of the tessellation instances may be associated with fewer vertices than the vertex count. For example, if the vertex count is 1,000 and a patch will result in 2,225 tessellated vertices then the first and second tessellation instances may each be associated with 1,000 vertices but the third tessellation instance may be associated with only 225 vertices. It will be appreciated that this can result in a reduction in throughput since a tessellation pipeline might not be operating at full capacity if it is processing a tessellation instance that will result in a number of vertices that is less than the vertex count.

To counter this reduction in throughput, in some arrangements it may be possible to combine tessellation instances from different patches that, when combined, result in a number of vertices less than or equal to the vertex count. For example, vertices from the first tessellation instance of a patch may be included in the final tessellation instance of a previous patch. Whilst this approach may mean that some tessellation instances have a more optimal number of vertices to generate, there may be added complexity in the processing of these tessellation instances since data relating to more than one patch may need to be provided to a tessellation pipeline for processing a particular tessellation instance, and since more than one tessellation operation may be required to process a particular tessellation instance.

Figure 9:
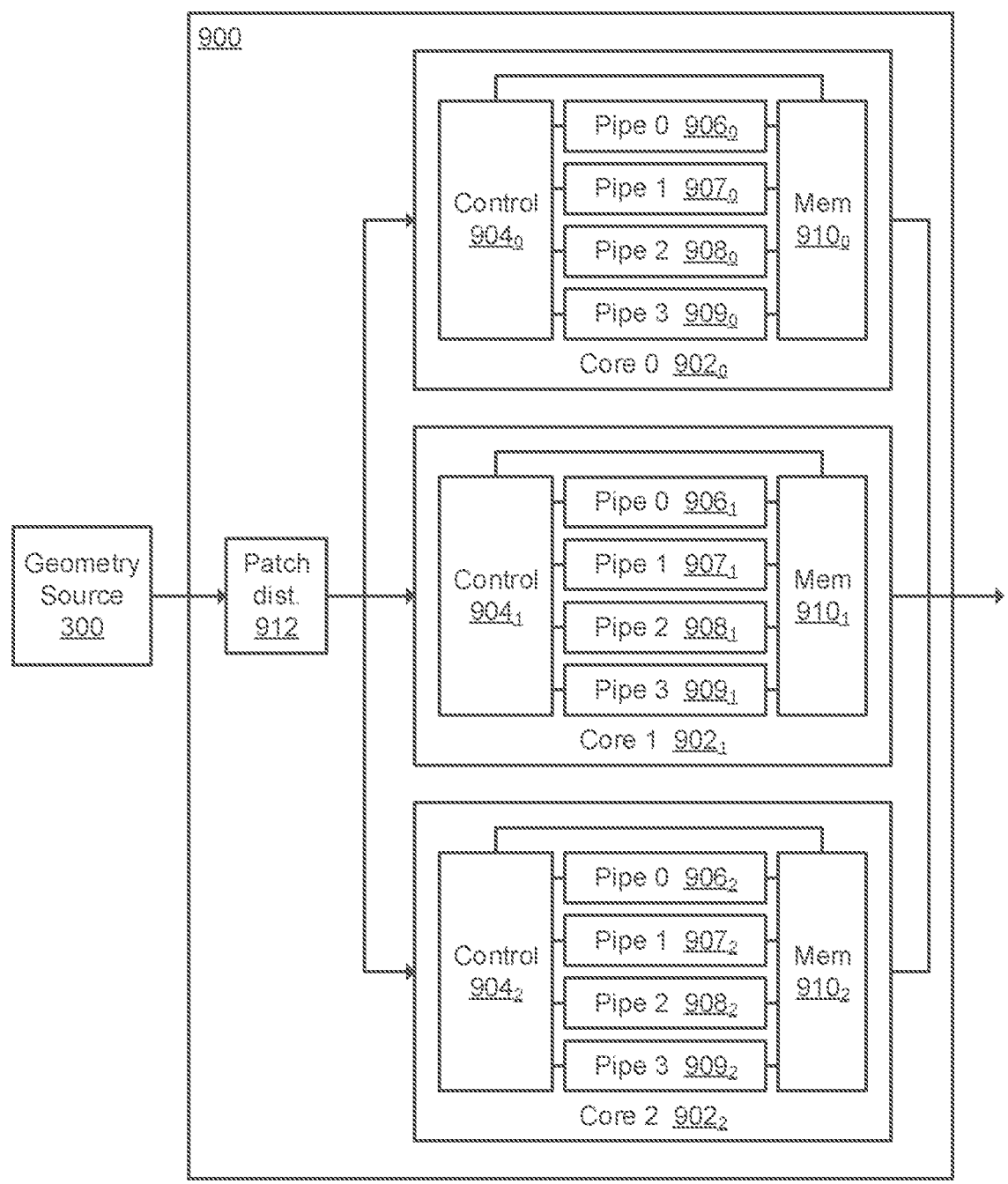
FIG. 9 shows a further example tessellation module according to the present disclosure.

FIG. 9 illustrates another example tessellation module 900 according to the present disclosure. The tessellation module 900 comprises three processing cores: core 0 ($902_0$), core 1 ($902_1$) and core 2 ($902_2$). Each core comprises a controller 904; four tessellation pipelines 906, 907, 908 and 909; and a memory 910. The tessellation module 900 also comprises a patch distributor 912.

The tessellation module 900 is provided with geometry data for one or more patches from a geometry source 300 which is configured to provide geometry data for patches in an order defined by an externally operating application. The geometry data for a particular patch may comprise untransformed vertex inputs in the form of control points that define the surface geometry of the patch.

Figure 10:
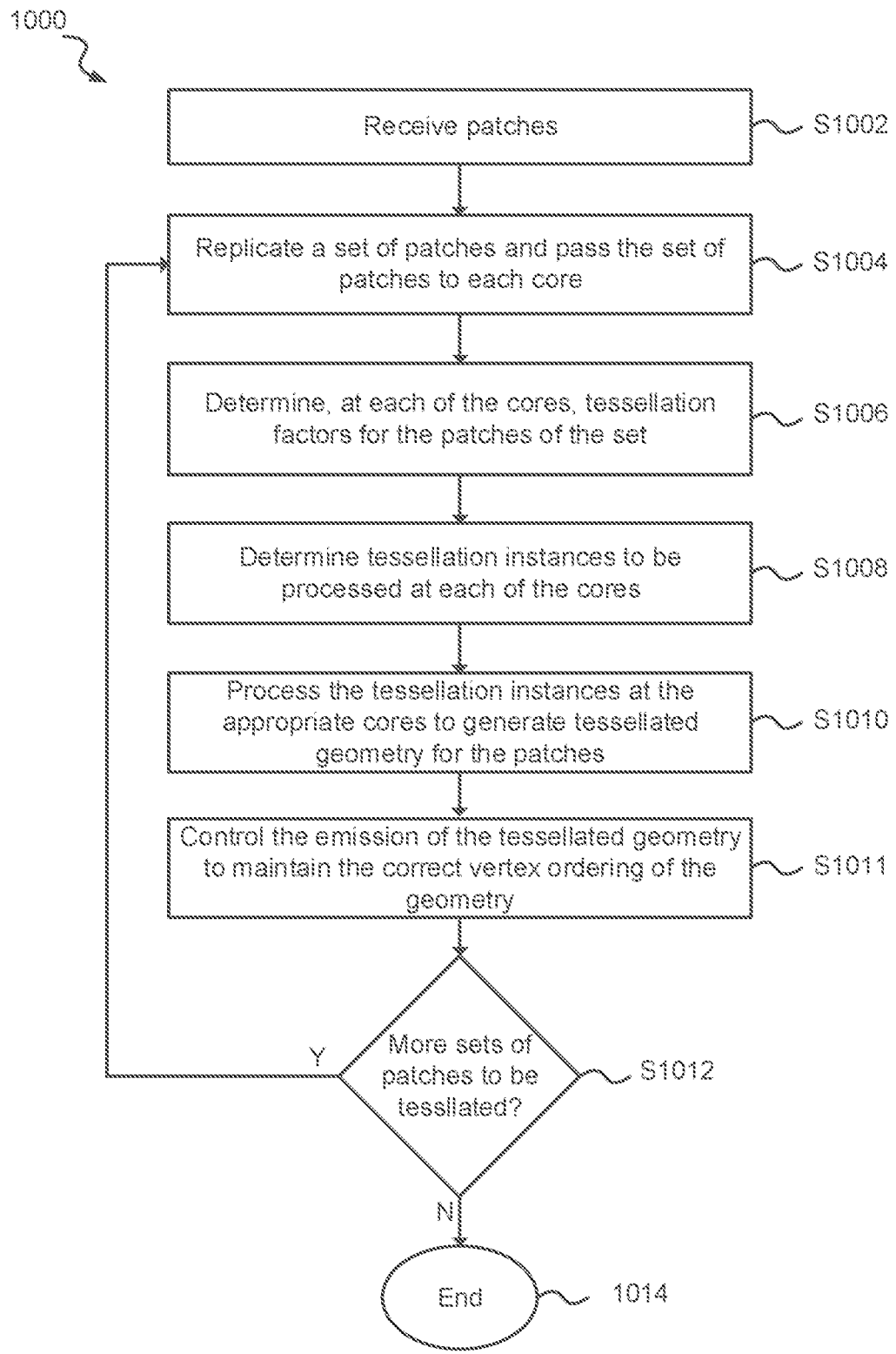
FIG. 10 is a flow chart for a method of tessellating a patch using the tessellation module shown in FIG. 9.

The operation of the tessellation module 900 is described with reference to the flow chart shown in FIG. 10. In step S1002, the geometry data for a set of one or more patches is received at the patch distributor 912 from the geometry source 300.

In step S1004, the patch distributor 912 replicates a set of patches and passes the set of patches to each core. The number of patches included in a set may be chosen to match the number of tessellation pipelines in each of the cores 902. Therefore, in the example shown in FIG. 9, a set of patches includes four patches, and this set of four patches is provided to each of the cores $902_0$, $902_1$ and $902_2$.

In step S1006, each of the cores operates independently to determine tessellation factors for the patches of the set. As described in the examples above, the tessellation factors are determined by executing vertex shaders and patch shaders. This may be described as a first execution phase. Step S1006 involves running vertex and patch shaders, at each of the cores 902, for the four patches of the set. Since each core 902 includes four pipelines (i.e. the number of pipelines in a core is the same as the number of patches in the set), each pipeline in a core performs vertex shading and patch shading for a respective patch of the set. By matching the number of patches in a set to the number of tessellation pipelines in a core the best utilisation of the hardware may be achieved.

For example, the set of patches that is distributed to the four cores includes four patches: patch 0, patch 1, patch 2 and patch 3. In core 0 $902_0$, pipeline 0 $906_0$ executes vertex shading and patch shading (e.g. including hull shading) for patch 0; pipeline 1 $907_0$ executes vertex shading and patch shading (e.g. including hull shading) for patch 1; pipeline 2 $908_0$ executes vertex shading and patch shading (e.g. including hull shading) for patch 2; and pipeline 3 $909_0$ executes vertex shading and patch shading (e.g. including hull shading) for patch 3. Similarly, in core 1 $902_1$, pipeline 0 $906_1$ executes vertex shading and patch shading (e.g. including hull shading) for patch 0; pipeline 1 $907_1$ executes vertex shading and patch shading (e.g. including hull shading) for patch 1; pipeline 2 $908_1$ executes vertex shading and patch shading (e.g. including hull shading) for patch 2; and pipeline 3 $909_1$ executes vertex shading and patch shading (e.g. including hull shading) for patch 3. Furthermore, in core 2 $902_2$, pipeline 0 $906_2$ executes vertex shading and patch shading (e.g. including hull shading) for patch 0; pipeline 1 $907_2$ executes vertex shading and patch shading (e.g. including hull shading) for patch 1; pipeline 2 $908_2$ executes vertex shading and patch shading (e.g. including hull shading) for patch 2; and pipeline 3 $909_2$ executes vertex shading and patch shading (e.g. including hull shading) for patch 3.

Therefore, following step S1006, each core has determined tessellation factors for each patch of the set. In step S1008, for each of the cores 902, the controller 904 determines the tessellation instances to be processed at that particular core. In other words, in step S1008, for each of the cores 902, the controller 904 determines an allocation of the tessellation instances to be processed on the tessellation pipelines of that core. The controller 904 of each core 902 has all the information it needs in order to work out which of the tessellation instances for a patch are to be processed at that core. For example, the controller 904 of each core 902 may have knowledge of: (i) the number of cores 902 and/or the number of tessellation pipelines 906-909 in the tessellation module 900, (ii) a functional position of the core 902 within the tessellation module 900, and (iii) the available output storage of the memories 910 in the cores 902. Based on this information, the controller $904_x$ of core $902_x$ can determine which of the tessellation instances for a patch the core $902_x$ is to process. This information can be pre-determined and stored locally in the controllers 904 for the cores 902, or some or all of this information can be provided to the cores 902 from the patch distributor 912. In this way, the cores 902 operate collectively to process all of the tessellation instances for a patch. In other words, a subset of the tessellation instances for a patch are allocated to the tessellation pipelines of a core, wherein collectively, over all of the cores, all of the tessellation instances for the patch are processed. The vertex and patch shading operations of the first execution phase are replicated across the different cores, but the domain shading operations (of the tessellation instances) are not replicated across different cores. The controller 904 passes appropriate tessellation instances to the respective tessellation pipelines 906-909 within a core 902.

The distribution of tessellation instances across the tessellation pipelines of multiple cores is preferably such that the tessellation instances of one patch are processed in as many tessellation pipelines as possible, in parallel, with tessellation instances of a first patch being scheduled before the instances of a second patch. In this way, the advantages of the scheduling of tessellation instances demonstrated in the descriptions of FIGS. 7 and 8 are also achieved in systems with multiple processing cores. There is some duplication of effort, e.g. at S1006, where tessellation factors for each patch are calculated at each core. However, this is a relatively small amount of computation, and it permits each core to perform the allocation of tessellation instances to its own tessellation pipelines without the need to communicate with the other cores. Avoiding the need for cores to communicate with each other avoids the need for a central control unit which may become a bottleneck, either in processing, or in silicon layout, and permits a more scalable parallel tessellation system.

In step S1010 the tessellation pipelines 906-909 process the tessellation instances to generate tessellated geometry for the patches in a second execution phase. As described above, the processing of a tessellation instance involves performing domain shading operations. Since the vertex shading and patch shading operations are performed for each patch in each core, each core has access to the results of the vertex and patch shading operations performed during the first execution phase. The domain shading may comprise consuming the output domain coordinates from a fixed function tessellation unit and the output control points from the patch shader and generating the position (and other data) of one or more vertices of the tessellated geometry. For a tessellation instance, the vertices of a tessellation instance are generated and passed to the memory 910 of the core 902.

In step S1011, the tessellated vertex data for each patch may be provided from the memories 910 of each of the cores 902, for further processing. As part of step S1011, control logic (e.g. controllers 904) controls the emission of the tessellated vertex data for the patches to ensure that the correct vertex ordering is maintained (in accordance with the submission order of the geometry from the geometry source 300). For example, processed vertices may be blocked from being emitted for a tessellation instance until processed vertices have been emitted for all prior tessellation instances. The emitted tessellated geometry may, for example, be further processed using a geometry shader and then passed to a culling module configured to cull vertices that are not visible in the scene (for example, using back-face culling or small-object culling) and then onto clipping, viewport transform and projection modules.

In step S1012, the tessellation module 900 determines whether there are more sets of patches to be tessellated. If there are more patches to be tessellated then the method passes back to step S1004 such that another set of patches is replicated and passed to each core. If necessary, a signal is sent to the geometry source to send more geometry data to the patch distributor 912. If it is determined in step S1012 that there are no more sets of patches to be tessellated then the method passes to S1014 at which the method ends.

The scheme described above with reference to FIGS. 9 and 10 may avoid implementing the vertex shading and patch shading stages in the second execution phase (i.e. after the tessellation instances have been determined). The replication of the vertex shading and patch shading stages across all of the cores ensures that each core has the results of the vertex shading and patch shading operations for any patch for which tessellation instances may be processed at that core. The controller 904 may include buffering to store data generated during the first execution phase such that it can be reused during the second execution phase. Alternatively, the second execution phase may duplicate at least a portion of the processing performed by the first execution phase in order to reduce the amount of storage required for buffering in controller 904.

In an example, the memory 910 of each of the cores 902 has capacity for 16 output (i.e. tessellated) vertices. It is noted that this number is variable based on vertex size, but for this simple example it is assumed that vertex data for 16 vertices can be stored in each memory 910 at a given time. Therefore, each tessellation instance is associated with four tessellated vertices of a patch so that a tessellation instance can be provided to each of the four pipelines 906-909 within a core at a given time. Four patches (patch 0, patch 1, patch 2 and patch 3) are included in a set.

In this example, initially, on each core 902, tessellation pipeline 0 906 performs vertex shading and patch shading on patch 0; tessellation pipeline 1 907 performs vertex shading and patch shading on patch 1; tessellation pipeline 2 908 performs vertex shading and patch shading on patch 2; and tessellation pipeline 3 909 performs vertex shading and patch shading on patch 3. Patch 0 produces 384 vertices, patch 1 produces 96 vertices, patch 2 produces 40 vertices and patch 3 produces 180 vertices.

Each of the controllers 904 determines that patch 0 is to be processed as 96 tessellation instances; patch 1 is to be processed as 24 tessellation instances; patch 2 is to be processed as 10 tessellation instances; and patch 3 is to be processed as 45 tessellation instances. These tessellation instances are allocated for execution by the pipelines of the cores 902. The table below shows how the tessellation instances (which can each be associated with up to four tessellated vertices) are distributed across the different pipelines of the different cores for these four patches:

| Core | Pipeline | Patch | Vertices |
|---|---|---|---|
| 0 | 0 | 0 | 0-3 |
| 0 | 1 | 0 | 4-7 |
| 0 | 2 | 0 | 8-11 |
| 0 | 3 | 0 | 12-15 |
| 1 | 0 | 0 | 16-19 |
| 1 | 1 | 0 | 20-23 |
| 1 | 2 | 0 | 24-27 |
| 1 | 3 | 0 | 28-31 |
| 2 | 0 | 0 | 32-35 |
| 2 | 1 | 0 | 36-39 |
| 2 | 2 | 0 | 40-43 |
| 2 | 3 | 0 | 44-47 |
| 0 | 0 | 0 | 48-51 |
| 0 | 1 | 0 | 52-55 |
| 0 | 2 | 0 | 56-59 |
| 0 | 3 | 0 | 60-63 |
| 1 | 0 | 0 | 64-67 |
| 1 | 1 | 0 | 68-71 |
| 1 | 2 | 0 | 72-75 |
| 1 | 3 | 0 | 76-79 |
| 2 | 0 | 0 | 80-83 |
| 2 | 1 | 0 | 84-87 |
| 2 | 2 | 0 | 88-91 |
| 2 | 3 | 0 | 92-95 |
| 0 | 0 | 1 | 0-3 |
| 0 | 1 | 1 | 4-7 |
| 0 | 2 | 1 | 8-11 |
| 0 | 3 | 1 | 12-15 |
| 1 | 0 | 1 | 16-19 |
| 1 | 1 | 1 | 20-23 |
| 2 | 0 | 2 | 0-3 |
| 2 | 1 | 2 | 4-7 |
| 2 | 2 | 2 | 8-9 |
| 0 | 0 | 3 | 0-3 |
| 0 | 1 | 3 | 4-7 |
| 0 | 2 | 3 | 8-11 |
| 0 | 3 | 3 | 12-15 |
| 1 | 0 | 3 | 16-19 |
| 1 | 1 | 3 | 20-23 |
| 1 | 2 | 3 | 24-27 |
| 1 | 3 | 3 | 28-31 |
| 2 | 0 | 3 | 32-35 |
| 2 | 1 | 3 | 36-39 |
| 2 | 2 | 3 | 40-43 |
| 2 | 3 | 3 | 44 |

Each line of the table shown above relates to a tessellation instance and indicates which pipeline of which core processes the tessellation instance, and also indicates which vertices of which patch are produced by processing the tessellation instance. The different cores, and the different pipelines of the cores, operate in parallel.

Figure 11:
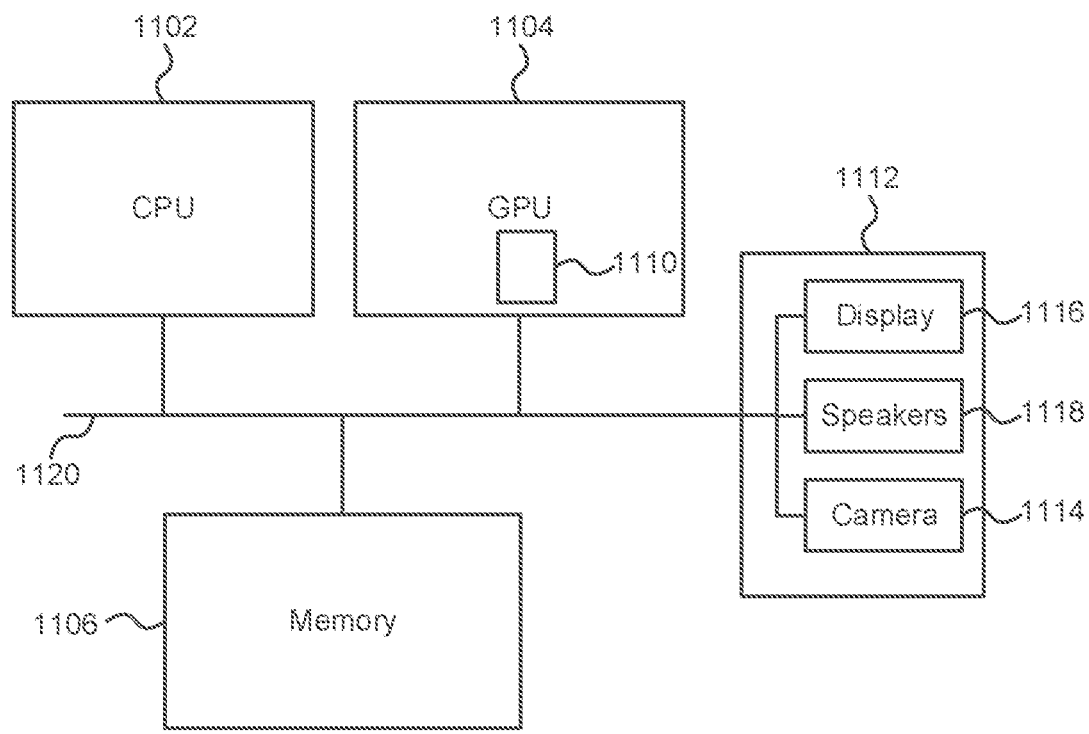
FIG. 11 shows a computer system in which a tessellation module is implemented.

FIG. 11 shows a computer system in which the graphics processing systems and tessellation modules described herein may be implemented. The computer system comprises a CPU 1102, a GPU 1104, a memory 1106 and other devices 1112, such as a display 1116, speakers 1118 and a camera 1114. A tessellation module 1110 (such as tessellation modules 200, 500 and 900) is implemented on the GPU 1104 The components of the computer system can communicate with each other via a communications bus 1120.

The tessellation modules described with reference to FIGS. 1 to 10 are shown as comprising a number of functional blocks. This is schematic only and is not intended to define a strict division between different logic elements of such entities. Each functional block may be provided in any suitable manner. It is to be understood that intermediate values described herein as being formed by a tessellation module need not be physically generated by the tessellation module at any point and may merely represent logical values which conveniently describe the processing performed by the tessellation module between its input and output.

The tessellation modules described herein may be embodied in hardware on an integrated circuit. The tessellation modules described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a tessellation module configured to perform any of the methods described herein, or to manufacture a tessellation module comprising any apparatus described herein. An integrated circuit definition dataset may be, for example, an integrated circuit description.

Therefore, there may be provided a method of manufacturing, at an integrated circuit manufacturing system, a tessellation module as described herein. Furthermore, there may be provided an integrated circuit definition dataset that, when processed in an integrated circuit manufacturing system, causes the method of manufacturing a tessellation module to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS™ and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a tessellation module will now be described with respect to FIG. 12.

Figure 12:
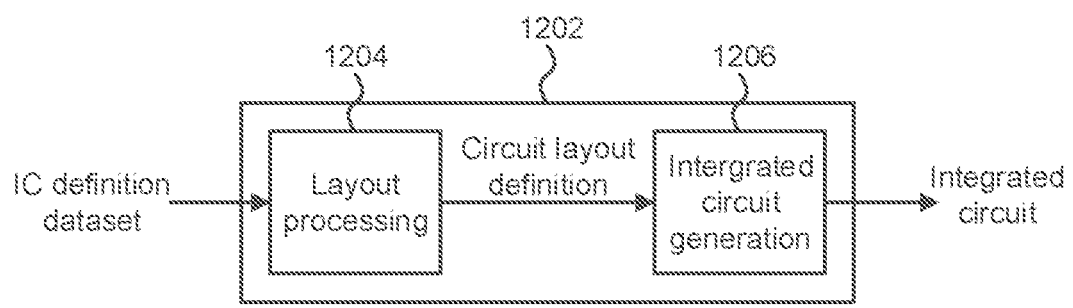
FIG. 12 shows an integrated circuit manufacturing system for generating an integrated circuit embodying a tessellation module.

FIG. 12 shows an example of an integrated circuit (IC) manufacturing system 1202 which is configured to manufacture a tessellation module as described in any of the examples herein. In particular, the IC manufacturing system 1202 comprises a layout processing system 1204 and an integrated circuit generation system 1206. The IC manufacturing system 1202 is configured to receive an IC definition dataset (e.g. defining a tessellation module as described in any of the examples herein), process the IC definition dataset, and generate an IC according to the IC definition dataset (e.g. which embodies a tessellation module as described in any of the examples herein). The processing of the IC definition dataset configures the IC manufacturing system 1202 to manufacture an integrated circuit embodying a tessellation module as described in any of the examples herein.

The layout processing system 1204 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1204 has determined the circuit layout it may output a circuit layout definition to the IC generation system 1206. A circuit layout definition may be, for example, a circuit layout description.

The IC generation system 1206 generates an IC according to the circuit layout definition, as is known in the art. For example, the IC generation system 1206 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1206 may be in the form of computer-readable code which the IC generation system 1206 can use to form a suitable mask for use in generating an IC.

The different processes performed by the IC manufacturing system 1202 may be implemented all in one location, e.g. by one party. Alternatively, the IC manufacturing system 1202 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a tessellation module without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 12 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 12, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A tessellation module configured to tessellate a patch to generate tessellated geometry data representing the tessellated patch, the tessellation module comprising:
   a plurality of cores, each core comprising a controller; and
   a patch distributor configured to replicate a set of patches and pass the set of patches to each of the plurality of cores;
   wherein each of the cores is configured to:
      identify tessellation factors for the patches of the set, and
      determine, at the controller of the core, based on the identified tessellation factors for the patches of the set, tessellation instances to be used in tessellating the patches of the set;
   wherein the controllers of the plurality of cores are configured such that collectively, over all of the cores, all of the tessellation instances for the patch are processed.

2. The tessellation module of claim 1, wherein each core comprises a plurality of tessellation pipelines.

3. The tessellation module of claim 2, wherein the plurality of tessellation pipelines are arranged to operate in parallel.

4. The tessellation module of claim 2, wherein each of the cores is configured to process a respective patch of the set at a respective tessellation pipeline to identify tessellation factors for the patches of the set.

5. The tessellation module of claim 2, wherein the controllers of the plurality of cores are configured such that a subset of the tessellation instances for a patch are allocated to the tessellation pipelines of a core.

6. The tessellation module of claim 2, wherein each core comprises a number of tessellation pipelines equal to the number of patches in the set.

7. The tessellation module of claim 2, wherein each core comprises a memory, and wherein the controller of a particular core is configured to determine the allocation of the tessellation instances amongst the tessellation pipelines of the particular core based on: (i) the number of cores in the tessellation module and/or the number of tessellation pipelines in the cores in the tessellation module, (ii) a functional position of the particular core within the plurality of cores of the tessellation module, and (iii) available output storage of the memories in the cores.

8. The tessellation module of claim 2, wherein the controller of a core is configured to provide side data to each of the tessellation pipelines of that core, the side data comprising data generated as a result of identifying the tessellation factors and wherein the tessellation pipelines of that core are configured to use the side data in processing the tessellation instances.

9. The tessellation module of claim 2, wherein the controller of a core is configured to provide, to each of the tessellation pipelines of that core, the identified tessellation factors for the patch and the received geometry data representing the patch.

10. The tessellation module of claim 2, wherein each of the cores comprises tessellation factor logic configured to process a respective patch of the set at a respective tessellation pipeline to identify tessellation factors for the patches of the set by:
performing first vertex shading to process geometry data on a per-control point basis; and
performing first patch shading on the processed geometry data to identify the tessellation factors.

11. The tessellation module of claim 2, wherein each of the tessellation pipelines is configured to generate tessellated geometry data by:
performing second vertex shading on a per-control point basis;
performing second patch shading on a plurality of control points; and
performing domain shading to generate vertex coordinates of the tessellated geometry data associated with the tessellation instance allocated to that tessellation pipeline.

12. The tessellation module of claim 1, wherein each of the tessellation instances, determined for a patch, is associated with a portion of tessellated geometry that will be generated when the patch is tessellated so that the tessellated geometry associated with all of the tessellation instances for the patch collectively define the tessellated geometry data for the patch.

13. The tessellation module of claim 1, wherein each of the cores is configured to:
determine, at the controller of the core, an allocation of the tessellation instances amongst the tessellation pipelines of the core; and
process the tessellation instances at the allocated tessellation pipelines to generate tessellated geometry data associated with the respective allocated tessellation instances.

14. The tessellation module of claim 1, wherein the controllers of the cores are configured to control emission of tessellated geometry data such that tessellated geometry data for a tessellation instance is not emitted until tessellated geometry data has been emitted for all prior tessellation instances.

15. The tessellation module of claim 1, wherein each of the tessellation instances is associated with a different portion of the tessellated geometry that will be generated when the patch is tessellated.

16. The tessellation module of claim 1, wherein, for determining the tessellation instances to be used in tessellating the patch, the controller of a core is configured to:
determine the number of vertices that are to be generated for the patch during tessellation based on the determined tessellation factors for that patch; and divide the number of vertices by a pre-determined number.

17. The tessellation module of claim 16, wherein each core comprises a plurality of tessellation pipelines, wherein each of the tessellation pipelines is associated with a memory and wherein the pre-determined number depends upon the size of the memory.

18. The tessellation module of claim 16, wherein each core comprises a plurality of tessellation pipelines, and wherein the pre-determined number is a maximum number of vertices that can be assigned to a single pipeline such that processing is not stalled by lack of storage.

19. A method of tessellating a patch in a tessellation module to generate tessellated geometry data representing the tessellated patch, the tessellation module comprising a plurality of cores, the method comprising:
replicating a set of patches and passing the set of patches to each of the plurality of cores;
at each of the cores:
identifying tessellation factors for the patches of the set, and
determining, based on the identified tessellation factors for the patches of the set, tessellation instances to be used in tessellating the patches of the set;
wherein, collectively, over all of the cores, all of the tessellation instances for the patch are processed.

20. A non-transitory computer readable storage medium having stored thereon a computer readable dataset description of an integrated circuit that, when processed in an integrated circuit manufacturing system, causes the integrated circuit manufacturing system to manufacture an integrated circuit embodying a tessellation module configured to tessellate a patch to generate tessellated geometry data representing the tessellated patch, the tessellation module comprising:
a plurality of cores, each core comprising a controller; and
a patch distributor configured to replicate a set of patches and pass the set of patches to each of the plurality of cores;
wherein each of the cores is configured to:
identify tessellation factors for the patches of the set, and
determine, at the controller of the core, based on the identified tessellation factors for the patches of the set, tessellation instances to be used in tessellating the patches of the set;
wherein the controllers of the plurality of cores are configured such that collectively, over all of the cores, all of the tessellation instances for the patch are processed.

* * * * *